Dec. 9, 1941.  F. LANE ET AL  2,265,694

FRICTION CLUTCH

Filed Feb. 27, 1939  3 Sheets-Sheet 1

Inventor
Francis Lane
John S Lane
by John E Easther
Attorney

Dec. 9, 1941.   F. LANE ET AL   2,265,694
FRICTION CLUTCH
Filed Feb. 27, 1939   3 Sheets-Sheet 3

Inventor
Francis Lane
by John Lane
John E. Eastlack
Attorney

Patented Dec. 9, 1941

2,265,694

UNITED STATES PATENT OFFICE 2,265,694

FRICTION CLUTCH

Francis Lane and John Skelding Lane, Brierley Hill, England

Application February 27, 1939, Serial No. 258,843

7 Claims. (Cl. 192—75)

This invention relates to friction clutches preferably operated by hydraulic fluid or compressed air for rope haulage or such like gear, wherein internal expanding clutch shoes are pivotally mounted within the confines of an external rotatable clutch ring upon the driven assembly. The improvements are designed to afford a more even distribution of the pressure of the clutch shoes with the outer clutch ring and also to enable an automatic alignment or centering of the clutch shoes to compensate for uneven wear. Further, other features reside in means for avoiding excessive movement of the shoes as wear takes place on the friction lining of same. The clutch is moreover simple in construction and has few wearing parts and is capable of easy adjustment.

In the accompanying drawings an illustrative embodiment of the invention is shown wherein—

Figure 1:
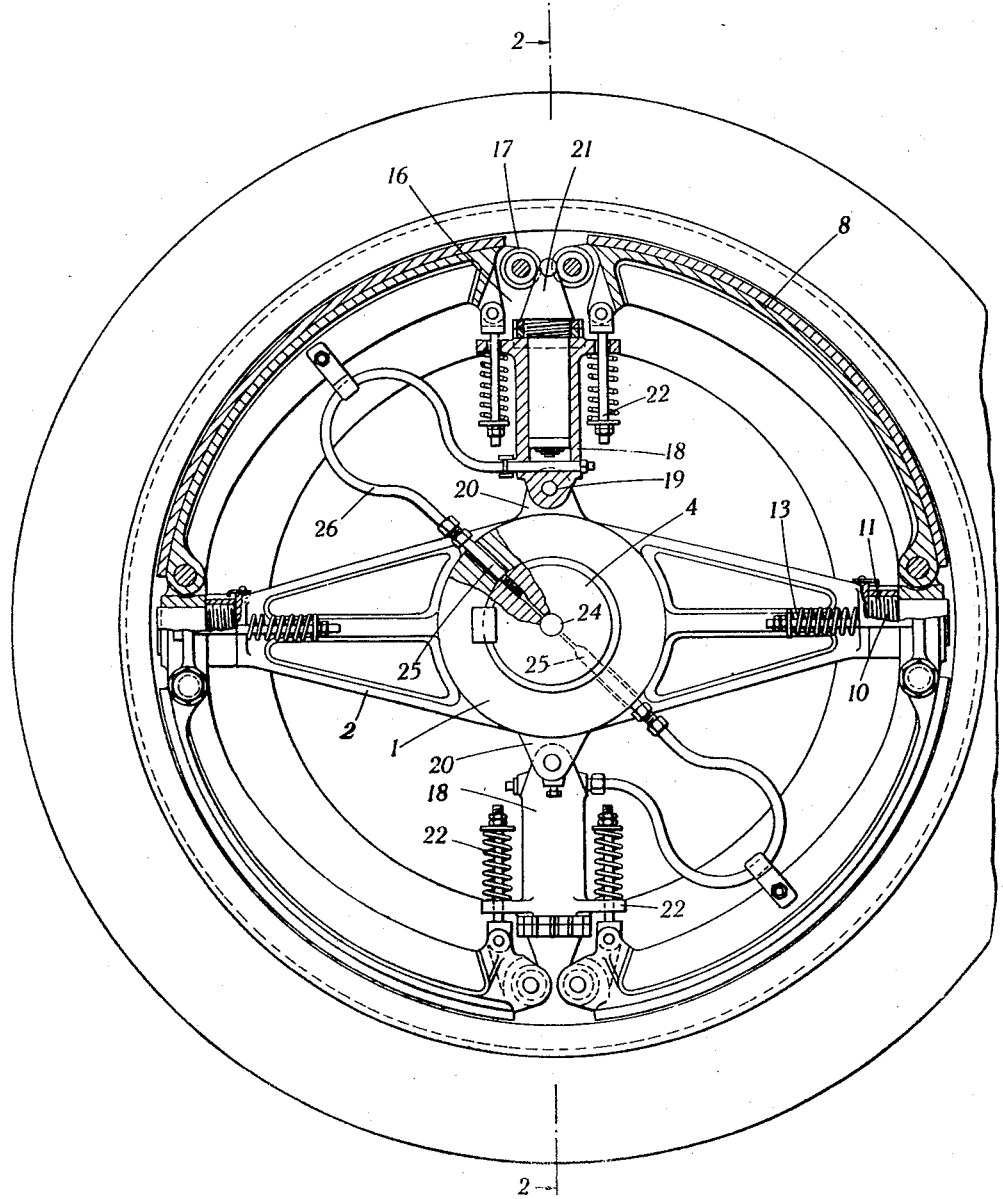
Fig. 1 is a front elevation in part section of a friction clutch with improvements associated therein.
Figure 2:
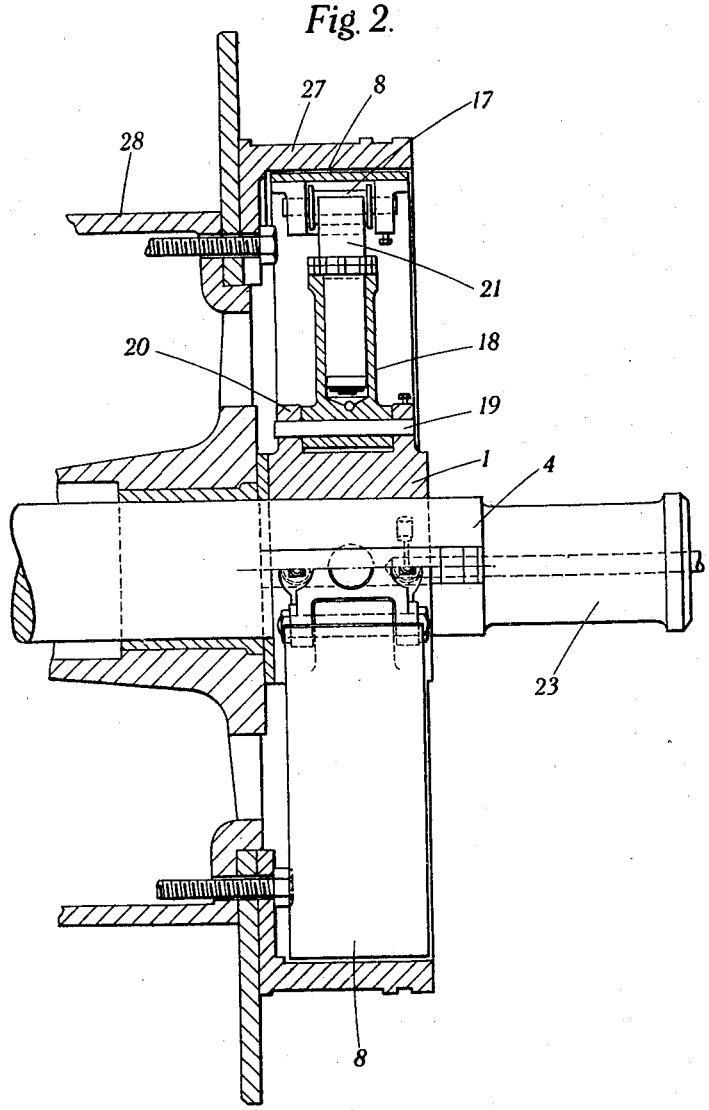
Fig. 2 is a part sectional side elevation on line 2—2 of Fig. 1.
Figure 3:
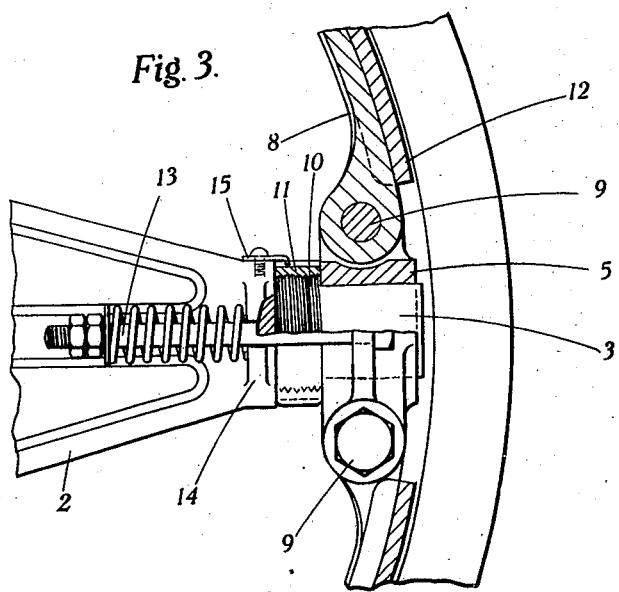
Fig. 3 is an enlarged sectional view on line 3—3 of Fig. 4.
Figure 4:
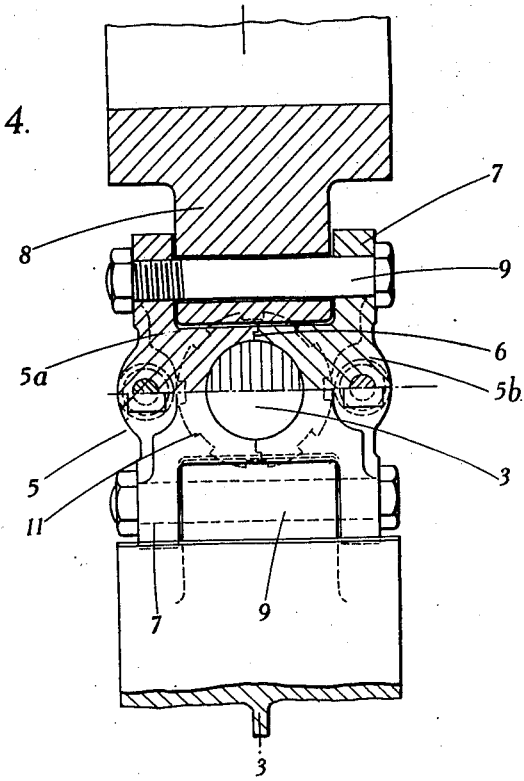
Fig. 4 is a part sectional end elevation of Fig. 3.

In accordance with this invention, an internal driving unit or beam comprises a central boss 1 and two oppositely extending radial arms 2 having circular or other shaped slide ends 3, the boss 1 being bored and keyed fast with a clutch driving shaft 4. Upon the slide ends 3 are two-part crossheads 5 which are capable of a limited sliding movement thereon in a radial direction. Each crosshead 5 is divided circumferentially upon the beam longitudinal centre line into two members 5a and 5b which encircle and continuously bear upon the slide end 3 and have interengaging spigoted faces 6 extending laterally from the slide end and are formed with side lugs 7 to engage the ends of the clutch shoes 8. Cross pins 9 are passed through the lugs 7 and shoes 8 for binding the members 5a and 5b together and providing pivotal parts for the clutch shoes upon the crossheads. With this construction, the crossheads 5 can be laterally placed about or removed from the slide ends 3 instead of being slipped on endwise. The arms 2 of the beam at a position inwardly of the slide ends 3 are formed with a threaded part 10 upon which is an adjusting ring 11 to adjust the inward position of the crosshead so as to prevent excessive movement when the friction lining 12 of the shoes 8 becomes worn down. The crossheads 5 are controlled by spring-loaded bolts 13 which operate through guide lugs 14 on the beam arms and are connected outwardly to the crossheads so as to retract the shoes 8 from driving contact.

The adjusting rings 11 are formed with a castellated surface with which engages a locking strip 15 in order to prevent creeping of said ring.

The shoes 8 remotely of the crosshead are formed with lugs 16 in which are mounted flanged rollers 17. Opposite these rollers are radially disposed plunger units 18 pivoted at 19 in lugs 20 cast upon the boss 1 of the driving member. The heads of the plunger units 18 have inwardly divergent or V planes 21 adapted to engage with the rollers 17 on the ends of the shoes 8 which are connected at this part to spring-pressed retraction bolts 22 carried by the plunger units 18. Any suitable driving agent or gear may be mounted on the bearing journal 23 of the driving shaft 4.

Fluid medium from a suitable source of supply is conducted to the plunger units 18 through a passage 24 bored through the centre of the driving shaft 4, thence through radial feeding stems 25 in said shaft and boss 1 of the driving beam to coiled pipes 26 conducting to the plunger units 18.

The driven member comprises an outer clutch ring 27 surrounding the clutch shoes 8, said clutch ring being secured to the rope drum 28 or equivalent unit running freely upon the clutch driving shaft 4.

In operation, as pressure fluid enters the plunger units 18, the inwardly-diverging or V planes 21 are forced against the rollers 17 so that the shoes 8 are impelled into driving contact with the outer clutch ring 27 of the rope or other drum 28. During this movement, the ends of the shoe 8 connected to the crossheads 5 are free to move outwards correspondingly on the slide ends 3 of the arms of the driving beam, so that the shoes 8 are expanded throughout their length in equal degree and thereby obtaining an even pressure over the whole friction lining. Upon releasing the pressure fluid from the plunger units 18, the retraction bolts 13 and 22 withdraw the shoes 8 from contact with the outer clutch ring 27 of the rope or like drum 28 and thereby break the drive.

While two beam arms, two plunger units, and four clutch shoes are provided in the embodiment of the clutch herein illustrated and described, the number of these parts employed may be varied as desired so long as they fall within the limits of the claims appended hereto.

Having thus described our invention what we claim is:

1. A friction clutch comprising an outer clutch ring, a driving shaft, a radial beam upon the shaft having a slide end, a crosshead slidable upon the slide end of the beam, said crosshead being divided centrally on the longitudinal centre line of the beam to form two adjoined side members encircling and continuously bearing upon the slide end of the beam and having interengaging faces extending laterally from said slide end, and clutch shoes actuated at ends thereof and having their opposite ends pivotally connected to the respective side members of the crosshead.

2. A friction clutch comprising an outer clutch ring, a driving shaft, a beam upon the shaft, a circular slide part upon the beam, a crosshead slidable upon said slide part, said crosshead being divided centrally on the longitudinal centre line of the beam to form two adjoined side members with projecting side lugs, said side members encircling and continuously bearing upon the slide end of the beam and having interengaging faces extending laterally from said slide end, and clutch shoes within the clutch ring actuated at ends thereof and having their opposite ends pivotally connected to the respective side members of the crosshead.

3. A friction clutch comprising an external clutch ring, a driving shaft, an internal beam with circular slide ends mounted upon the shaft, a crosshead slidable upon each of the slide ends, said crosshead being circumferentially and centrally divided on the longitudinal centre line of the beam to form two adjoined side members each having side lugs, said disk members encircling and continuously bearing upon the slide end of the beam and having interengaging spigoted faces extending laterally from said slide end, clutch shoes for engagement with the clutch ring and having ends thereof interposed between the lugs of the respective side members of the crosshead, and transverse hinge pins passed through the lugs and interposed ends of the shoes for connecting the latter to the crosshead.

4. A friction clutch comprising an outer clutch ring, a clutch driving shaft centrally disposed thereto, a beam upon the shaft having opposite slide ends, a crosshead slidable upon each slide end, said crosshead being formed of two laterally related adjoined members with side lugs, spring retracted clutch shoes actuated at ends thereof and having their opposite ends engaging between the lugs, a hinge pin passed through the lugs and interposed end of each clutch shoe, and an adjusting ring upon the beam for adjusting the inward position of the clutch shoes.

5. A friction clutch comprising an outer clutch ring, a central clutch driving shaft, a beam upon the shaft having opposite slide ends, a crosshead formed of two laterally adjoined members adapted to slide upon the slide ends, spring retraction means tending to retract the crosshead, clutch shoes pivotally connected to the crosshead, and an adjusting ring upon the beam for inwardly positioning the crosshead.

6. A friction clutch comprising an outer clutch ring, a central clutch driving shaft, a beam keyed to the driving shaft having slide ends on opposite sides thereof, crossheads slidably mounted on the slide ends, each crosshead being of two conjoined members having side lugs, clutch shoes actuated at ends thereof and having their opposite ends interposed between the lugs of the respective conjoined members, cross pins passed through the lugs and interposed shoe ends, spring retraction bolts connected to the crosshead, a castellated screw-adjusting ring upon the beam, and a locking strip engaging the castellated part of the adjusting ring.

7. A friction clutch comprising an outer clutch ring, a clutch driving shaft, a beam fixed upon the shaft having circular slide ends, a divided crosshead formed of two conjoined members having interengaging spigoted faces, and side lugs projecting in spaced relation, clutch shoes hingedly mounted at their operated ends and at their free ends engaging between the lugs, transverse pins passed through the lugs and shoe ends, spring-retraction bolts carried and guided by the beam connected to the crosshead and screw adjusting rings engaging a screwed part of the beam bearing against the inner face of the crosshead for adjusting the latter.

FRANCIS LANE.
JOHN S. LANE.